US008578736B2

(12) United States Patent
Dawes et al.

(10) Patent No.: US 8,578,736 B2
(45) Date of Patent: *Nov. 12, 2013

(54) SOOT RADIAL PRESSING FOR OPTICAL FIBER OVERCLADDING

(75) Inventors: Steven Bruce Dawes, Corning, NY (US); Douglas H Jennings, Corning, NY (US); Nicolas LeBlond, Painted Post, NY (US); Christopher Scott Thomas, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1034 days.

This patent is subject to a terminal disclaimer.

(21) Appl. No.: 12/235,931

(22) Filed: Sep. 23, 2008

(65) Prior Publication Data

US 2010/0071421 A1 Mar. 25, 2010

(51) Int. Cl.
*C03B 37/10* (2006.01)
(52) U.S. Cl.
USPC .................................. 65/17.3; 65/413; 65/421
(58) Field of Classification Search
USPC .............................. 65/413–422, 427, 401, 17.3
See application file for complete search history.

(56) References Cited

U.S. PATENT DOCUMENTS

| | | | |
|---|---|---|---|
| 4,501,601 A | 2/1985 | Haupt | 65/2 |
| 4,620,862 A * | 11/1986 | Dorn et al. | 65/399 |
| 4,867,774 A | 9/1989 | Dorn | 65/3.14 |
| 5,185,020 A | 2/1993 | Satoh et al. | 65/3.11 |
| 5,215,564 A | 6/1993 | Weber | 65/3.11 |
| 5,244,485 A * | 9/1993 | Hihara et al. | 65/412 |
| 5,261,938 A | 11/1993 | Kitamura et al. | 65/3.11 |
| 5,318,432 A | 6/1994 | Yagi et al. | 425/466 |
| 5,352,259 A * | 10/1994 | Oku et al. | 65/412 |
| 5,711,215 A * | 1/1998 | Sextl et al. | 100/211 |
| 7,647,792 B2 * | 1/2010 | Ichii et al. | 65/415 |
| 2005/0220692 A1 | 10/2005 | Mangold et al. | 423/335 |
| 2006/0115913 A1 | 6/2006 | Orita et al. | 438/22 |

FOREIGN PATENT DOCUMENTS

| | | | |
|---|---|---|---|
| JP | 59 019891 | 5/1984 | C03B 37/00 |
| JP | 61 256937 | 11/1986 | C03B 37/012 |
| JP | 63 055132 | 3/1988 | C03B 37/014 |
| JP | 04 325430 | 11/1992 | C03B 37/012 |
| JP | 1993294658 | 11/1993 | C03B 37/012 |
| JP | 05345628 A * | 12/1993 | |
| JP | 06080436 A * | 3/1994 | |
| JP | 2007230814 | 9/2007 | C03B 20/00 |

OTHER PUBLICATIONS

Dorn, R., "Mechanically Shaped Preforms for Optical Fiber Production", Electrical Communication, vol. 59, No. 4, 1985, pp. 396-400.

(Continued)

*Primary Examiner* — Queenie Dehghan
(74) *Attorney, Agent, or Firm* — Matthew J. Mason

(57) ABSTRACT

A method and apparatus for making an optical fiber preform. The apparatus has an outer wall and an inner wall. The outer wall surrounds the inner wall and the inner wall surrounds an inner cavity of the apparatus. A consolidated glass rod is deposited in the inner cavity after which particulate glass material, such as glass soot, is deposited in the inner cavity around the glass rod. A radially inward pressure is applied against the particulate glass material to pressurize the particulate glass material against the glass rod.

28 Claims, 8 Drawing Sheets

(56) References Cited

OTHER PUBLICATIONS

Yoshida, K., et al., "Hybridised fabrication process for optical fibres", Electronics Letters, Feb. 1, 1996, vol. 32, No. 3, pp. 242-243.

Dorn, Reimund, et al., "0.27-dB/km Attenuation Achieved by MSP Preform Process", Journal of Lightwave Technology, Jun. 1991, vol. 9, No. 6, pp. 709-714.

Yoshida, Kazuaki, et al., "Fracture Origins of Optical Fibers Fabricated by Hybridized Process", Journal of Lightwave Technology, Nov. 1996, vol. 14, No. 11, pp. 2506-2512.

Yoshida, Kazuaki, et al. "Fabrication of large preforms for low-loss single-mode optical fibers by a hybridized process", Glass Science and Technology, 1996, vol. 69, pp. 412-416.

\* cited by examiner

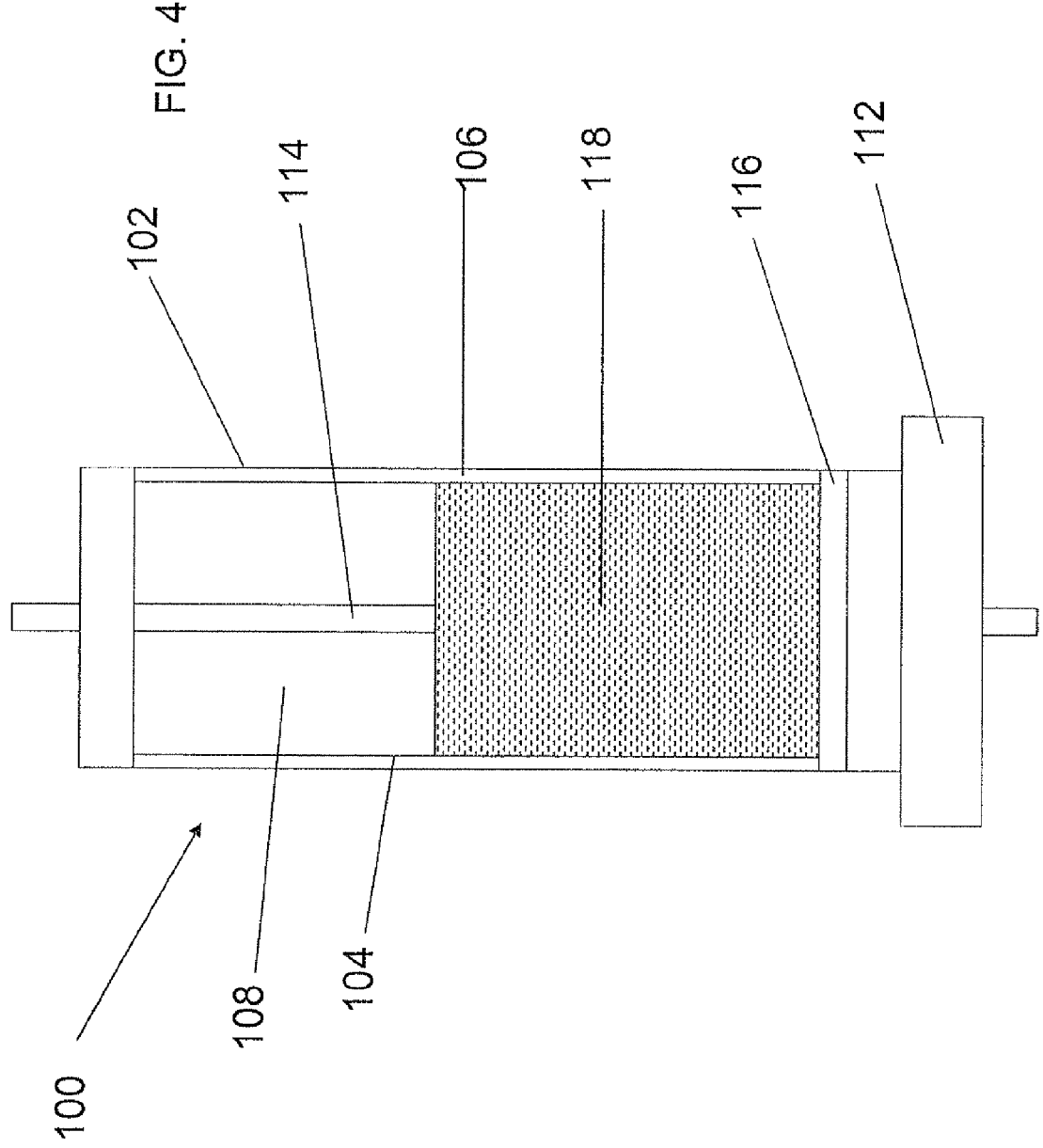

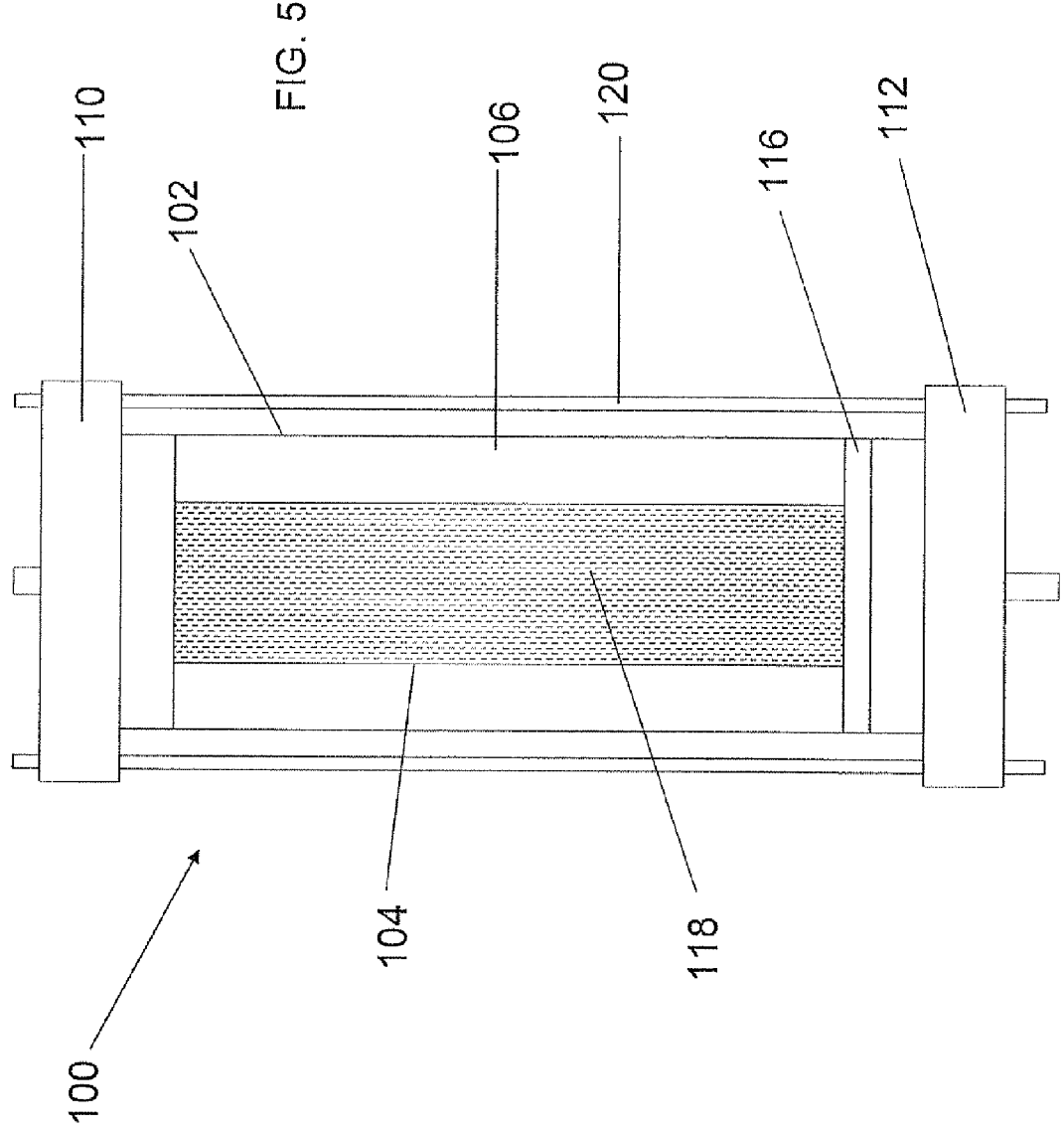

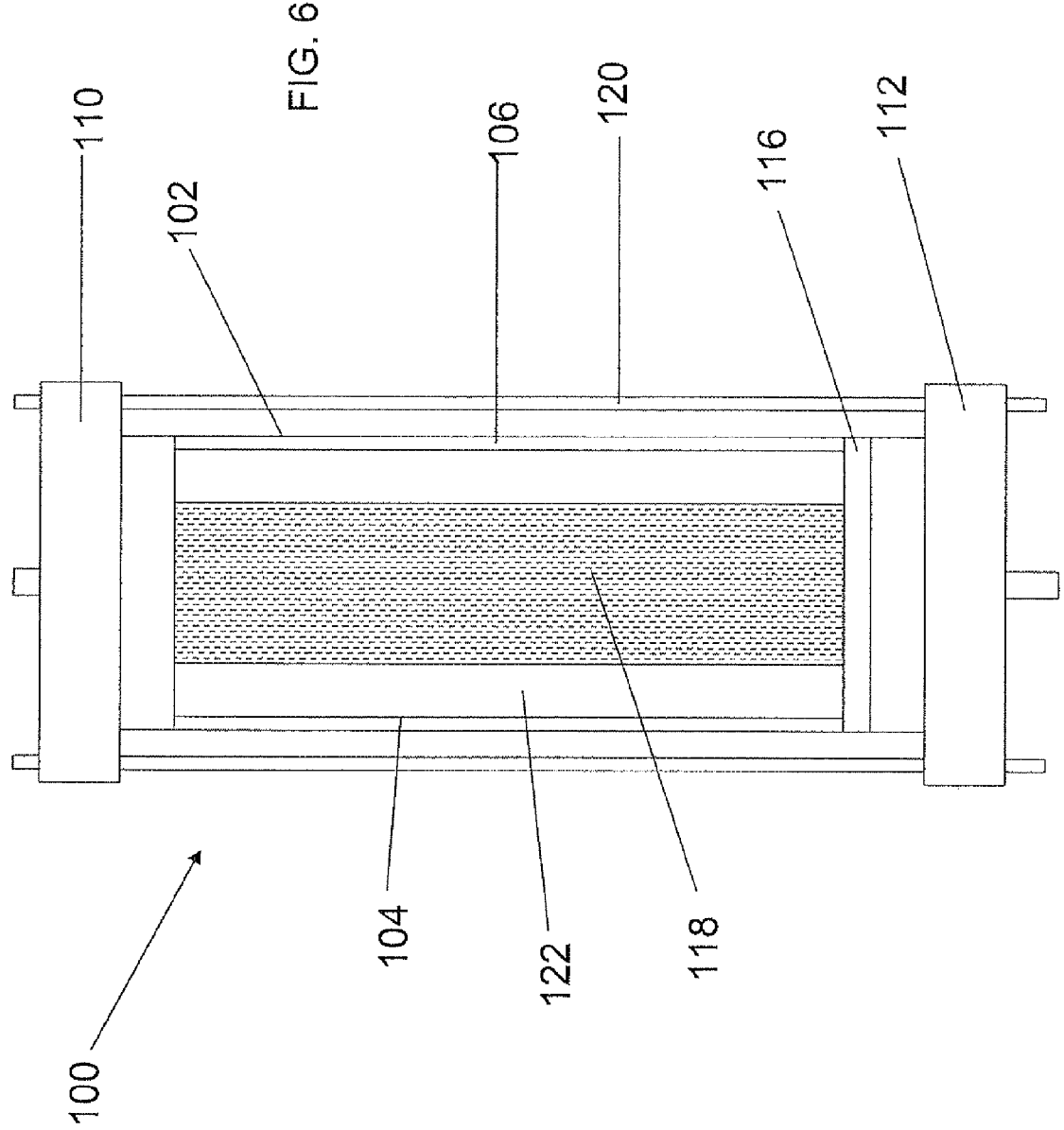

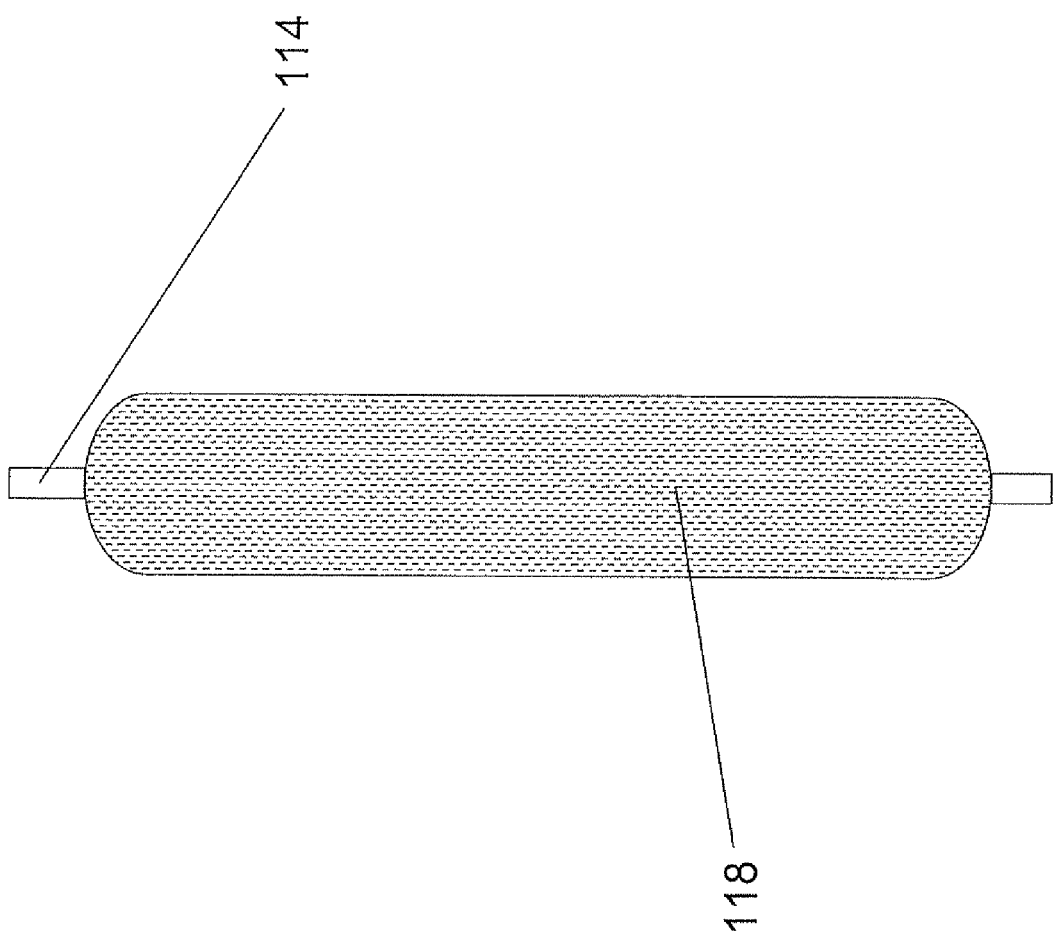

SOOT RADIAL PRESSING FOR OPTICAL FIBER OVERCLADDING

BACKGROUND OF THE INVENTION

1. Field of the Invention

The present invention relates generally to methods and apparatus for soot radial pressing for optical fiber overcladding, and particularly to methods and apparatus for making optical fiber preforms.

2. Technical Background

Conventional chemical vapor deposition (CVD) processes, such as outside vapor deposition (OVD) and vapor axial deposition (VAD) processes, for making optical fiber preforms often utilize only a portion of the starting raw material due to limitations in the deposition efficiency of the OVD process. Use of the resulting "waste" silica soot could, therefore, potentially result in significant raw material cost savings.

Accordingly, different methods have been devised to utilize otherwise unutilized silica soot in the production of optical fiber preforms. These methods, which include, for example, axial pressing, sol-gel (and other "wet") processes can suffer from a variety of drawbacks including expensive, complicated, and/or time consuming processing conditions and equipment, and may result in preforms with less than desirable properties such as unacceptable variability with respect to preform density and geometry.

SUMMARY OF THE INVENTION

One aspect of the invention is a method for making an optical fiber preform. The method includes depositing a glass rod into an inner cavity of an apparatus, the apparatus including an outer wall and an inner wall, the outer wall surrounding the inner wall and the inner wall surrounding the inner cavity. The method additionally includes depositing particulate glass material in the inner cavity between the glass rod and the inner wall. In addition, the method includes applying a radially inward pressure of from 25 psig to 250 psig against the particulate glass material to pressurize the glass material against the glass rod.

In another aspect, the present invention includes an optical fiber preform made in accordance with the above method, wherein the particulate material pressurized against the glass rod has a density of from 0.6 to 1.2 grams per cubic centimeter and the preform has a largest and smallest diameter along its axial length, wherein the smallest diameter is at least 90% of the largest diameter.

In yet another aspect, the present invention includes an apparatus for making an optical fiber preform. In one embodiment, the apparatus includes a rigid outer wall and a flexible inner wall. The rigid outer wall surrounds the flexible inner wall and the flexible inner wall surrounds an inner cavity of the apparatus. The flexible inner wall preferably has a tensile strength of 95 to 7,000 psi and an elongation of 200% to 800%. Radially inward pressure is applied by providing a pressurized fluid between the rigid outer wall and the flexible inner wall.

In another embodiment, the inner wall includes a rolled sheet with interdigitated fingers. Radially inward pressure is applied by pulling the interdigitated fingers in opposite directions in order to reduce the diameter of the rolled sheet.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 4 illustrates a partial cross-sectional side view of an apparatus that can be used in accordance with a preferred method of the present invention wherein glass soot is deposited in the inner cavity between the glass rod and the flexible inner wall;

FIG. 5 illustrates a partial cross-sectional side view of an apparatus that can be used in accordance with a preferred method of the present invention wherein the glass soot is pressurized by providing a pressurized fluid between the rigid outer wall and the flexible inner wall;

FIG. 6 illustrates a partial cross-sectional side view of an apparatus that can be used in accordance with a preferred method of the present invention wherein pressurized fluid is mostly removed from between the rigid outer wall and the flexible inner wall;

FIG. 7 illustrates a partial cross-sectional side view of a pressed soot/cane assembly that is removed from the apparatus and is ready for cleaning and consolidation.

DETAILED DESCRIPTION OF THE PREFERRED EMBODIMENTS

Figure 1:
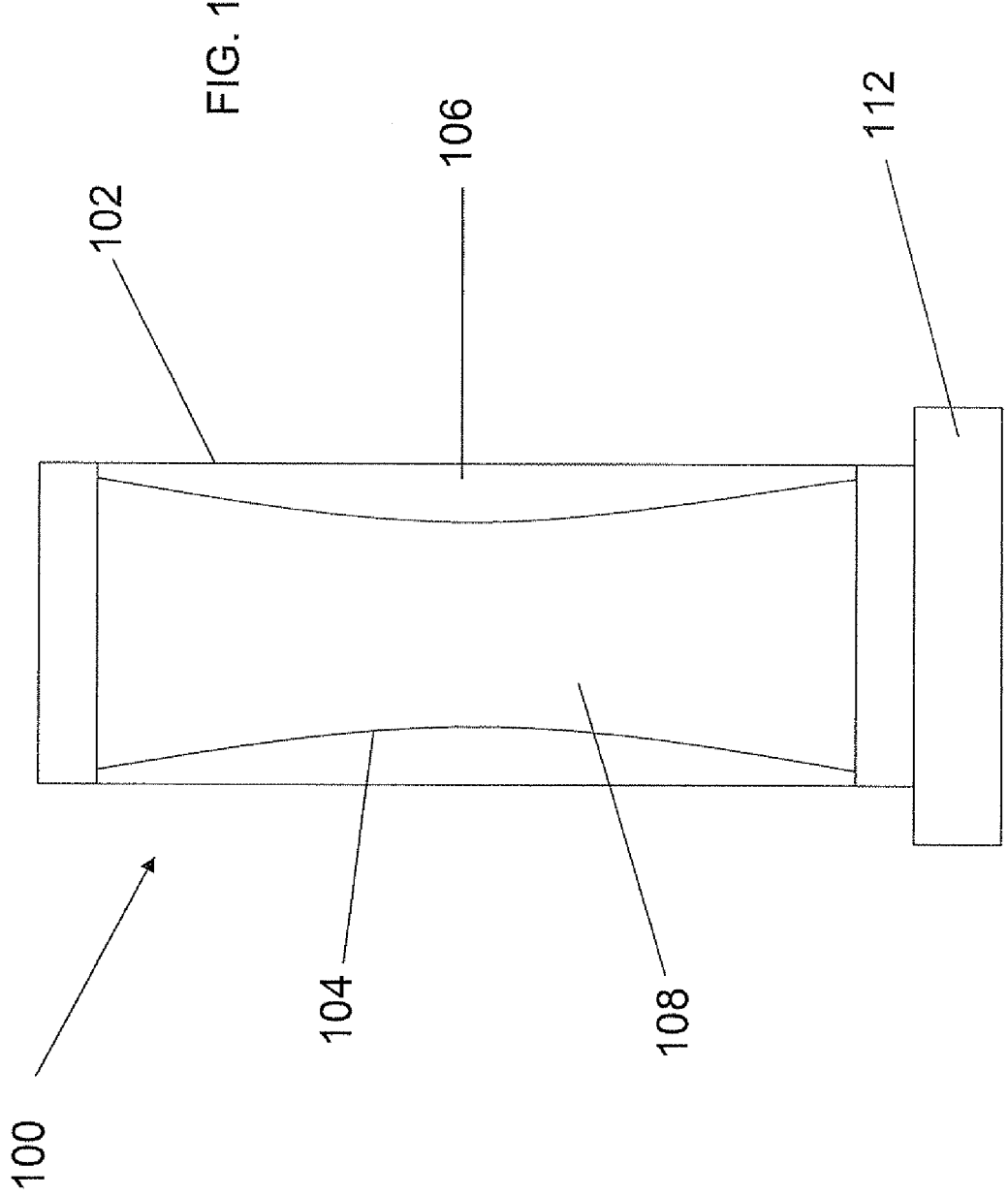
FIG. 1 illustrates a partial cross-sectional side view of an apparatus that can be used in accordance with a preferred method of the present invention wherein the pressure on either side of a flexible inner wall of the apparatus is approximately equal.

Reference will now be made in detail to the present preferred embodiments of the invention, examples of which are illustrated in the accompanying drawings. Whenever possible, the same reference numerals will be used throughout the drawings to refer to the same or like parts.

The present invention relates to methods and apparatus for making an optical fiber preform that include depositing and pressurizing particulate glass material, such as glass soot, around a glass surface. Preferably, the glass surface is a glass rod. Preferably, the glass rod is a core cane. By core cane what is meant is a consolidated glass rod which includes at least a portion of the core glass of an optical fiber which will eventually be drawn from a preform using the core cane. The core cane may include at least a portion of the cladding glass of an optical fiber which will eventually be drawn from a preform using the core cane. Alternatively, the core cane may be surrounded by a porous soot clad layer.

The particulate glass material may be undoped silica, or the particulate glass material may be doped. Potential dopants include at least F, B, Ge, Er, Ti, Al, Li, K, Rb, Cs, Cl, Br, Na, Nd, Bi, Sb, Yb and combinations thereof The particulate glass material may be left over spray soot or otherwise left over soot from a CVD process ("CVD waste soot"), such as left over soot from an OVD process ("OVD waste soot") or left over soot from a VAD process ("VAD waste soot"), or glass soot from any other silica source, such as sand, or mixtures of glass soots of different type, or mixtures of sand and glass soot.

The particulate glass material can be untreated (e.g., silica soot or CVD waste soot containing no additional coagulants or solvents) or may be treated with one or more coagulants or solvents, such as water or an organic solvent. In preferred embodiments, the particulate glass material is untreated. Preferably, the particulate glass material has an average tap density of from 0.1 to 1.0 grams per cubic centimeter, even more preferably of from 0.1 to 0.5 grams per cubic centimeter, such as from 0.2 to 0.4 grams per cubic centimeter, including about 0.3 grams per cubic centimeter.

Reference will now be made to FIGS. 1-6, which illustrate a preferred method and apparatus in accordance with the invention, FIG. 1 shows a partial cross-sectional side view of an apparatus that can be used in accordance with embodiments of the present invention. Apparatus 100 includes a cylindrical rigid outer wall 102 and a flexible inner wall 104, wherein the flexible inner wall 104 surrounds an inner cavity 108 of the apparatus and the area between the rigid outer wall 102 and flexible inner wall 104 defines an annular cavity 106. By "rigid" we mean rigid as compared to the flexible inner wall 104 and by "flexible" we mean flexible as compared to the rigid outer wall 102. In the embodiment shown in FIG. 1, the pressure on either side of the flexible inner wall 104 is approximately equal, that is the pressure in the annular cavity 106 is approximately equal to the pressure in the inner cavity 108. Apparatus 100 further includes a top end cap 110 (shown in FIGS. 5 and 6) and a bottom end cap 112. Top end cap 110 and bottom end cap 112 each preferably include a centerline hole (not shown) for receiving and centering a glass rod. Top end cap 110 and bottom end cap 112 each preferably provide a pressure seal at the top and bottom of annular cavity 106 and also each preferably allow excess air in the inner cavity 108 to escape via the centerline hole. Preferred materials, for end caps include metals, such as aluminum, or plastics.

Cylindrical rigid outer wall 102 can be made of any material that has the mechanical strength to withstand, without appreciable deformation, the maximum normal operating pressures in the annular cavity 106. In a preferred embodiment, cylindrical rigid outer wall 102 is made of aluminum. Other preferred materials for cylindrical rigid outer wall 102 include, for example, other metals or plastics. In a preferred embodiment, cylindrical rigid outer wall 102 has a substantially uniform diameter along its axial length. In alternative preferred embodiment, cylindrical rigid outer wall 102 has a diameter that varies slightly along its axial length to counter pressure differences that may exist at the top and bottom of the apparatus 100. Cylindrical rigid outer wall 102 may comprise a uniform cylindrical piece or it may comprise two or more cylindrical segments attached end to end.

Flexible inner wall 104 can be made of any material that has sufficient elasticity and yield strength to sufficiently elastically deform radially inwardly without suffering plastic deformation when subjected to the maximum normal operating pressures in the annular cavity 106. In a preferred embodiment, flexible inner wall 104 is a tube made of a latex material, such as standard elastomeric latex tubing available from Piercan USA, Inc. Other preferred materials for flexible inner wall 104 include, for example, Neoprene, Buna-N, polyurethane, or silicone rubber. Preferably, flexible inner wall 104 has a tensile strength of 95 to 7,000 psi and an elongation of 200% to 800%. In a preferred embodiment, flexible inner wall 104 is sealed to cylindrical rigid outer wall 102. The seal may be accomplished, for example, by compressing a flap (not shown) onto the outside surface of the cylindrical rigid outer wall 102 or by fixing with an adhesive. In such an embodiment, a pressurization access point and valve (not shown) can be provided in order to pressurize and depressurize annular cavity 106. In an alternative embodiment, flexible inner wall 104 can comprise a toroidal bladder fitted into the cylindrical rigid outer wall 102. In such an embodiment, a seal between the toroidal bladder and the cylindrical rigid outer wall 102 is not necessary.

Figure 2:
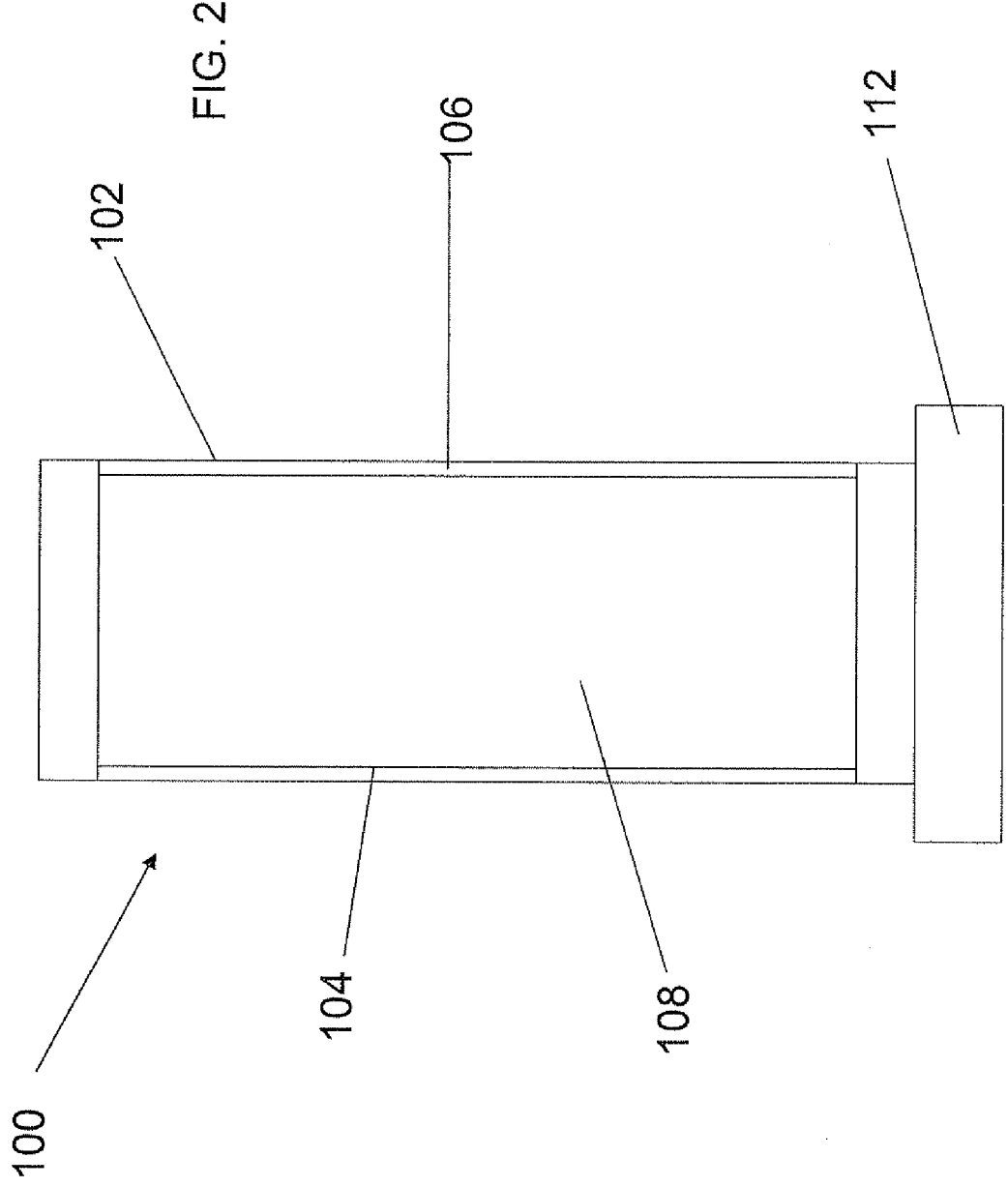
FIG. 2 illustrates a partial cross-sectional side view of an apparatus that can be used in accordance with a preferred method of the present invention wherein the air between a flexible inner wall and a rigid outer wall of the apparatus has been mostly removed.

As shown in FIG. 2, annular cavity 106 can be depressurized such that air or other fluid has been mostly or nearly completely removed from annular cavity 106. As a result of such depressurization, flexible inner wall 104 elastically deforms radially outwardly such that, as shown in FIG. 2, the maximum outer diameter of flexible inner wall 104 is nearly equal to the inner diameter of rigid outer wall 102. Meanwhile, the volume of annular cavity 106 is decreased while the volume of inner cavity 108 is increased.

Figure 3:
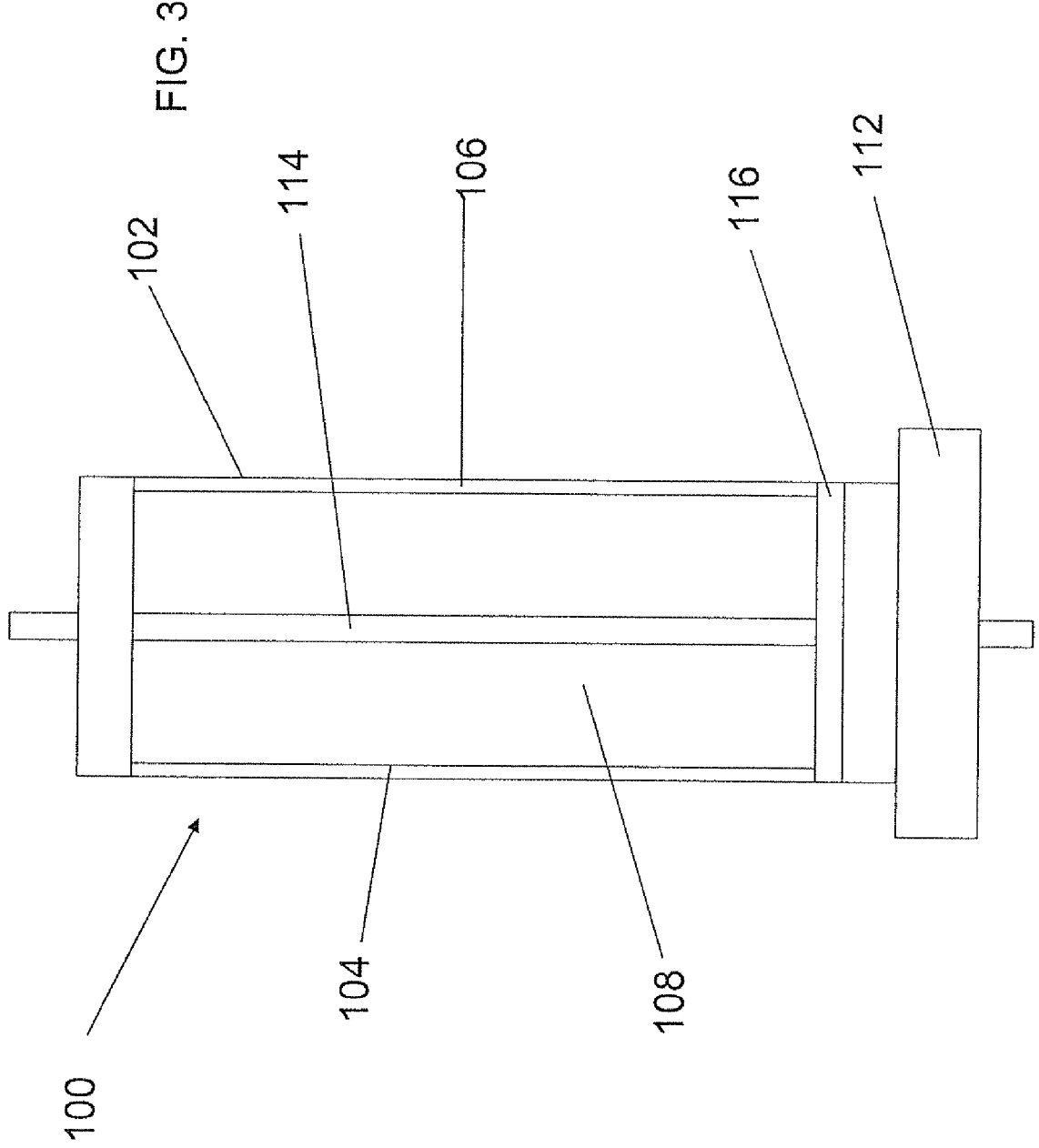
FIG. 3 illustrates a partial cross-sectional side view of an apparatus that can be used in accordance with a preferred method of the present invention wherein a glass rod is centered within an inner cavity of the apparatus.

As shown in FIG. 3, a consolidated glass rod 114 may be placed and centered in inner cavity 108 of apparatus 100. As shown in FIG. 3, annular cavity 106 is depressurized as in FIG. 2. Glass rod 114 can extend through inner cavity 108 as well as through centerline hole (not shown) in bottom end cap 112 such that top and bottom portions of glass rod 114 extend out of apparatus 100. A plug 116 made of, for example, foam rubber may be placed at the bottom of inner cavity 108. Plug 116 has a centerline hole (not shown) for receiving glass rod 114. Plug 116 preferably has a diameter that is about the same as the inner diameter of rigid outer wall 102 and centerline hole of plug 116 preferably has a diameter that is about the same or slightly smaller than the diameter of glass rod 114 such that plug 116 fits snugly at the bottom of inner cavity 108 and around glass rod 114. Plug 116 can serve to prevent loose soot from escaping through the bottom of the apparatus and can further serve to impart rounded or tapered ends to the pressed soot body.

As shown in FIG. 4, particulate glass material, such as glass soot 118, can be deposited or poured through the top of apparatus 100 into inner cavity 108 between glass rod 114 and flexible inner wall 104. As shown in FIG. 4, annular cavity 106 is depressurized as in FIG. 2. While FIG. 4 shows inner cavity 108 approximately half filled with glass soot 118, in preferred embodiments, glass soot is deposited or poured into inner cavity 108 until inner cavity 108 is nearly full. Following the depositing or pouring of glass soot 118 into inner cavity 108, an additional plug (not shown) may be placed above glass soot 118 and around glass rod 114 near the top of inner cavity 108. Preferably, inner cavity 108 is depressurized following deposition of glass soot 118 into inner cavity.

As shown in FIG. 5, the glass soot 118 deposited in inner cavity 108 is pressurized by providing a pressurized fluid in annular cavity 106 between rigid outer wall 102 and flexible inner wall 104. In preferred embodiments, top end cap 110 is placed into position and connected to bottom end cap 112 using threaded rods 120. Next, fluid can be gradually introduced into annular cavity 106 such that the pressure in annular cavity gradually increases from negative to positive pressure as compared to atmospheric pressure. Preferably, the pressure in annular cavity 106 is increased at a rate of less than 50 psi/min, and even more preferably at a rate of less than 20 psi/min, such as from 2 to 20 psi/mi and further such as from 5 to 15 psi/min. As the pressure of the pressurized fluid in annular cavity 106 gradually increases to increasingly higher positive gauge pressures, flexible inner wall 104 elastically deforms radially inwardly against glass soot 118 (causing the volume of annular cavity 106 to gradually increase and the volume of inner cavity 108 to gradually decrease) and glass soot 118 is pressed radially inwardly toward glass rod 114. Preferably, the pressure of the pressurized fluid in annular cavity 106 is increased until it reaches a maximum predetermined value. The pressure may or may not be held at this value for a predetermined amount of time. When held for a predetermined amount of time, the pressure may, for example, be held for at least 1 minute, such as from 1 minute to 10 minutes, including about 5 minutes.

In preferred embodiments, during the step of pressuring the glass soot, the pressurized fluid has a maximum pressure of from 25 psig to 250 psig, such as from 50 to 200 psig, and further such as from 75 to 150 psig. Examples of pressurized fluid include air, inert gases (e.g., nitrogen), water, and oil. A particularly preferred pressurized fluid is air. In preferred embodiments, during the step of pressurizing the glass soot, the temperature of the inner cavity 108 is less than 50° C., such as from 20° C. to 40° C., and even more preferably, room temperature (i.e., between 20° C. and 25° C.).

After the soot as been pressed sufficiently, as shown in FIG. 6 the pressurized fluid in annular cavity 106 may be released such that annular cavity 106 is depressurized as in FIG. 2 (such that the pressure in annular cavity 106 is less than the pressure in inner cavity 108). Preferably, the pressure in annular cavity 106 is decreased at a rate of less than 50 psi/min, and even more preferably at a rate of less than 20 psi/min, such as from 2 to 20 psi/min and further such as from 5 to 15 psi/min. As the pressure in annular cavity 106 gradually decreases, flexible inner wall 104 deforms radially outwardly away from pressed glass soot 118 (causing the volume of annular cavity 106 to gradually decrease and the volume of inner cavity 108 to gradually increase) such that an annular gap 122 is present in inner cavity 108 between the outer diameter of pressed glass soot 118 and flexible inner wall 104.

Following depressurization of annular cavity 106, pressed soot/cane assembly or porous preform (an example of which is shown in FIG. 7) is ready to be removed from apparatus for cleaning and consolidation.

Figure 8A:
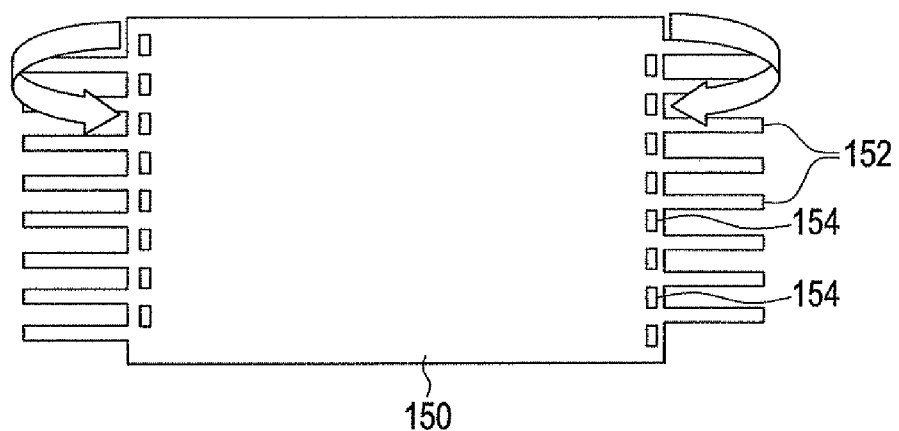
FIGS. 8A and 8B illustrate a side view of a sheet with interdigitated fingers that can be used in accordance with a preferred method of the invention wherein, in FIG. 8A the sheet is in the unrolled position and in FIG. 8B the sheet is in the rolled position.
Figure 8B:
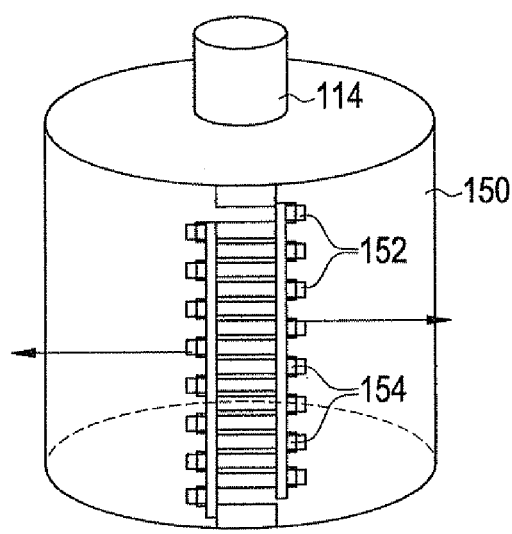

In an alternative embodiment, radially inward pressure can be applied against particulate glass soot by using as an inner wall, a sheet with interdigitated fingers that is rolled into a cylindrical form. An example of such a sheet is illustrated in FIGS. 8A and 8B, wherein, in FIG. 8A, the sheet is shown in the unrolled position and, in FIG. 8B, the sheet is shown in the rolled position. Sheet 150 includes a plurality of interdigitated fingers 152 and a plurality of slots 154 on each end, as shown in FIG. 8A. In the rolled position, interdigitated fingers 152 from each end of the sheet extend into slots 154 on the opposing end of the sheet 150, such that the interdigitated fingers 152 from opposing ends of the sheet extend in opposite directions as shown in FIG. 8B. The rolled sheet can then extend circumferentially around a glass rod 114 that may be centered in a centering hole of a centering chuck (not shown). Particulate glass soot can then be deposited or poured into the annular cavity between the rolled sheet 150 and the glass rod 114 after which the interdigitated fingers that extend in opposite directions can each be pulled in their respective opposing directions in order to reduce the diameter of the pulled sheet and provide a radially inward pressure against the particulate glass soot.

In preferred embodiments, the glass rod 114 is a core cane. In alternative preferred embodiments, the glass rod 114 is a core cane surrounded by a porous soot clad layer.

In preferred embodiments, porous preforms can be provided in which the particulate glass material pressurized against the glass rod has a density of at least 0.5 grams per cubic centimeter, such as from 0.6 to 1.2 grams per cubic centimeter, and further such as from 0.8 to 1.0 grams per cubic centimeter, including about 0.9 grams per cubic centimeter. The density of the particulate glass material pressurized against the glass rod is largely a function of the maximum pressure applied during the step of pressurizing the particulate glass material. Generally, the greater maximum pressure applied during the step of pressurizing the particulate glass material, the greater the density of that material and, hence, the greater the overall density of the porous preform. Using methods disclosed herein, porous preforms having a density of at least 0.6 grams per cubic centimeter can be produced using maximum pressures of at least 50 psig, porous preforms having a density of at least 0.7 grams per cubic centimeter can be produced using maximum pressures of at least 100 psig, porous preforms having a density of at least 0.8 grams per cubic centimeter can be produced using maximum pressures of at least 150 psig, and porous preforms having a density of at least 0.9 grams per cubic centimeter can be produced using maximum pressures of at least 200 psig.

In preferred embodiments, the porous preform has a substantially uniform diameter in the axial direction. Preferably, the smallest diameter of the preform along its axial length is at least 90% of its largest diameter along its axial length. Even more preferably, the smallest diameter of the preform along its axial length is at least 95% of its largest diameter along its axial length.

Porous preforms made in accordance with embodiments disclosed herein are capable of being consolidated into a glass blank using standard consolidation equipment and processes and then drawn into optical fiber using standard drawing equipment and processes. Preferably, the pressed soot surrounding the cane of the porous preform will eventually form overcladding once the porous preform is consolidated and drawn into an optical fiber, such that at least 35%, and further such as at least 40%, and even further such as at least 50% of the total mass of the overcladding is derived from the pressed soot. When consolidated into a glass blank, porous preforms made in accordance with embodiments disclosed herein can preferably provide a consolidated blank wherein the smallest ratio of the outer diameter of the core to the outer diameter of the cladding (i.e., the smallest core/clad ratio) is at least 98% of the largest ratio of the outer diameter of the core to the outer diameter of the cladding (i.e., the largest core/clad ratio) along the axial length of the blank.

The adhesion of the soot to the cane can be improved by creating a static charge on the cane (e.g., by rubbing with a piece of silk) prior to filling the apparatus with soot. The bottom of the cane can be made to be of slightly larger diameter than the rest of the cane so that the pressed soot would not fall off. The surface of the cane could be roughened by grinding or etching, or by applying a thin layer of soot by OVD.

EXAMPLES

The invention will be further clarified by the following examples.

Example 1

An optical fiber preform was made using an apparatus having a rigid cylindrical outer wall and a flexible inner wall. The rigid cylindrical outer wall was made of aluminum having an inner diameter of 4 inches, a length of 18 inches, and a wall thickness of ¼ inch. The flexible inner wall was a latex rubber tube having a diameter of about 2.5 inches in the unstressed state. The top and bottom ends of the latex rubber tube were wrapped over the top and bottom ends of the aluminum cylinder. The apparatus further included top and bottom aluminum end caps, each end cap having a thickness of about 1 inch, a center hole to accommodate a core cane, and four peripheral holes for accommodating threaded rods.

The air between the flexible inner wall and rigid outer wall was substantially removed so that the outside diameter of the flexible inner wall was essentially the same as the inside diameter of the rigid outer wall. Then a one inch thick, open-pored silicone rubber foam plug with approximately the same diameter as the inside diameter of the rigid cylinder was inserted into the cavity so that it was flush with the bottom of the cylinder. The bottom of the cylinder was then sealed with an aluminum end-cap and a Viton o-ring. A 19 mm diameter fused silica cane was then placed inside the cavity with its bottom end inserted into a hole at the center of the bottom plug. The top of the cane was kept centered using a temporary jig made of PTFE. Waste silica soot from an OVD overcladding process with a tap density of 0.3 g/cc was loaded into the cavity while occasionally tapping the size of the rigid cylinder to ensure consistent compaction of the soot. When the soot reached a level about one inch below the top of the cylinder, the centering jig was removed and a second silicone rubber foam plug was slid into place. The top of the cylinder was sealed with a second aluminum end-cap and Viton o-ring. The top and bottom end-caps were secured onto the ends of the cylinder by connecting them to each other with threaded rods and tightened with wing nuts. The inner cavity was then evacuated through the top end-cap. The space between the flexible wall and rigid wall was then pressurized to 150 psig over a period of 10 minutes using a compressed air cylinder. The pressure was maintained at 150 psig for approximately 5 minutes. The inner cavity was then allowed to return to atmospheric pressure. The pressure from the annular cavity was then bled off over a period of 10 minutes through a valve on the side of the cylinder. The top end-cap was then removed and the air in the annular cavity was pumped out so that the diameter of the flexible wall was large enough to remove the top foam plug and the soot preform. The resulting soot preform had a diameter of about 58 mm and a density of about 0.89 g/cc.

The soot preform was heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform was then consolidated in a vertical down-drive furnace. The furnace was purged at 1000° C. in 10% oxygen for one hour, then 5% chlorine for one hour, then the preform was sintered in helium by translating at 10 mm/min from 1000° C. to 1430° C. and then 1.5 mm/min from 1430° C. to a peak of 1466° C. then back to 1430° C.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for making an optical fiber preform comprising the steps of:
   depositing a glass rod into an inner cavity of an apparatus, the apparatus comprising an outer wall and an inner wall, the outer wall surrounding the inner wall and the inner wall surrounding the inner cavity;
   depositing particulate glass material in the inner cavity between the glass rod and the inner wall; and
   applying a radially inward pressure of from 25 psig to 250 psig against the particulate glass material to pressurize the particulate glass material against the glass rod and form the optical fiber preform.

2. The method of claim 1 wherein the step of applying a radially inward pressure comprises providing a pressurized fluid between the outer wall and the inner wall.

3. The method of claim 2, wherein the pressurized fluid is air.

4. The method of claim 1, wherein the glass rod is a consolidated glass rod.

5. The method of claim 1, wherein the glass rod comprises a consolidated core cane surrounded by a porous soot clad layer.

6. The method of claim 1, wherein prior to the step of applying a radially inward pressure against the particulate glass material, the particulate glass material has an average density of from 0.1 to 0.5 grams per cubic centimeter.

7. The method of claim 1, wherein the particulate glass material is waste soot from a CVD deposition operation.

8. The method of claim 1, wherein subsequent to the step of applying a radially inward pressure against the particulate glass material, the particulate glass material pressurized against the glass rod has a density of from 0.6 to 1.2 grams per cubic centimeter.

9. The method of claim 1, wherein during the step of applying a radially inward pressure against the particulate glass material, the temperature of the inner cavity is less than 50° C.

10. The method of claim 1, wherein the inner wall comprises a flexible material having a tensile strength of 95 to 7,000 psi and an elongation of 200% to 800%.

11. The method of claim 1, wherein the inner wall comprises a toroidal bladder.

12. The method of claim 1, wherein the inner wall comprises a rolled sheet with interdigitated fingers and the step of applying a radially inward pressure comprises pulling the interdigitated fingers in opposite directions in order to reduce the diameter of the rolled sheet.

13. The method of claim 1, wherein the preform has a largest and smallest diameter along its axial length, wherein the smallest diameter is at least 90% of the largest diameter.

14. The method of claim 1, wherein the radially inward pressure is from 50 psig to 200 psig.

15. The method of claim 1, wherein subsequent to the step of applying a radially inward pressure against the particulate glass material, the particulate glass material pressurized against the glass rod has a density of from 0.8 to 1.0 grams per cubic centimeter.

16. The method of claim 1, wherein the outer wall is cylindrical.

17. A method for making an optical fiber preform comprising the steps of: depositing a glass rod into an inner cavity of an apparatus, the glass rod comprising a core cane region which is surrounded by a porous layer of soot, the porous layer of soot applied by OVD, and the apparatus comprising an outer wall and an inner wall, the outer wall surrounding the inner wall and the inner wall surrounding the inner cavity;
   depositing particulate glass material in the inner cavity between the glass rod and the inner wall; and
   applying a radially inward pressure against the particulate glass material to pressurize the particulate glass material against the glass rod and form the optical fiber preform.

18. The method of claim 17, wherein the porous layer of soot is a soot clad layer.

19. The method of claim 17, wherein the step of applying a radially inward pressure comprises providing a pressurized fluid between the outer wall and the inner wall.

20. The method of claim 19, wherein the pressurized fluid is at least one fluid selected from the group consisting of air and an inert gas.

21. The method of claim 17, wherein subsequent to the step of applying a radially inward pressure against the particulate glass material, the particulate glass material pressurized against the glass rod has a density of from 0.6 to 1.2 grams per cubic centimeter.

22. The method of claim 17, wherein the step of applying a radially inward pressure comprises increasing the pressure in an annular cavity between the outer wall and the inner wall at a rate of less than 50 psi/min until the pressure reaches a maximum predetermined value.

23. The method of claim 22, wherein the step of applying a radially inward pressure comprises holding the pressure in the annular cavity at the maximum predetermined value for at least one minute subsequent to which the pressure in the annular cavity is decreased at a rate of less than 50 psi/min.

24. The method of claim 17, wherein prior to depositing particulate glass material in the inner cavity between the glass rod and the inner wall, an annular cavity between the outer wall and the inner wall is depressurized, causing inner wall to elastically deform radially outwardly.

25. The method of claim 17, wherein subsequent to the step of applying a radially inward pressure against the particulate glass material, at least 35% of glass material surrounding the core region is the particulate glass material pressurized against the glass rod.

26. The method of claim wherein rounded or tapered ends are imparted to the optical fiber preform.

27. The method of claim 26, wherein the rounded or tapered ends are imparted by at least one plug in the inner cavity.

28. The method of claim 17, wherein the outer wall is cylindrical.

* * * * *